United States Patent

Häuser

[11] Patent Number: 5,860,737
[45] Date of Patent: Jan. 19, 1999

| | | | |
|---|---|---|---|
| [54] | METHOD FOR CONTINUOUSLY MIXING AND DEGASSING LIQUID | | |
| [75] | Inventor: | Erhard Häuser, Schöffengrund, Germany | |
| [73] | Assignee: | Eckhard Muller, Germany | |
| [21] | Appl. No.: | 817,672 | |
| [22] | PCT Filed: | Oct. 20, 1995 | |
| [86] | PCT No.: | PCT/EP95/04113 | |
| | § 371 Date: | Apr. 21, 1997 | |
| | § 102(e) Date: | Apr. 21, 1997 | |
| [87] | PCT Pub. No.: | WO96/12596 | |
| | PCT Pub. Date: | May 2, 1996 | |
| [30] | Foreign Application Priority Data | | |
| Oct. 20, 1994 [DE] Germany .......................... 44 37 598.0 | | | |
| [51] | Int. Cl.⁶ .................................................. B01F 13/06 | | |
| [52] | U.S. Cl. .............................................. 366/139; 95/266 | | |
| [58] | Field of Search ........................... 366/139, 75, 76.9, 366/76.1, 76.92; 95/266, 262; 425/203 | | |

[56] References Cited

U.S. PATENT DOCUMENTS

| | | | |
|---|---|---|---|
| 2,530,403 | 11/1950 | Seaman ................................... 366/139 |
| 3,918,687 | 11/1975 | Hubers et al. ........................... 366/139 |
| 4,370,302 | 1/1983 | Suzuoka et al. ........................ 366/139 |
| 4,474,473 | 10/1984 | Higuchi et al. ......................... 366/139 |
| 4,486,100 | 12/1984 | Endo et al. ............................. 366/139 |
| 4,802,769 | 2/1989 | Tanaka ..................................... 366/75 |
| 4,846,054 | 7/1989 | Mange et al. ............................. 366/75 |
| 4,902,455 | 2/1990 | Wobbe .................................... 366/139 |
| 5,409,523 | 4/1995 | Haeuser .................................. 95/266 |
| 5,494,425 | 2/1996 | Stehr ....................................... 95/266 |

*Primary Examiner*—Tony G. Soohoo
*Attorney, Agent, or Firm*—Longacre & White

[57] ABSTRACT

A method for continuously mixing and degassing liquid, castable media, in particular components of casting resin or a casting-resin component with a filler such as quartz dust, aluminum oxide or dyes, and the equipment with which to implement the method. One object of the invention is to assure that casting-resin components are available in homogeneous and degassed form for further processing by either liquid components or a liquid component and a filler which are metered into a continuous degassing apparatus (1).

14 Claims, 5 Drawing Sheets

METHOD FOR CONTINUOUSLY MIXING AND DEGASSING LIQUID

BACKGROUND OF THE INVENTION

1. Field of the Invention

The invention concerns a method for continuously mixing and degassing liquid, castable media, in particular components of casting resins and, where called for, fillers such as quartz dust, aluminum oxide or dyes, using a continuous degassing apparatus as well as equipment for carrying out the method.

2. Description of the Prior Art

An apparatus and a procedure for continuously degassing casting resin is known from the German patent document 42 22 695 A1. During the resin casting, the resins or hardeners may have to be mixed with fillers such as quartz dust, Mikrodol (ground dolomite), aluminum oxide and the like, or with further substances such as dyes, and must be degassed under vacuum in order that the products made from such casting-resin formulations, for instance electrically insulating parts, be endowed with the required properties. Whereas the mixtures of the resin/filler or hardener/filler are prepared in so-called formulating operations, and then are delivered to the end processor, other end consumers carry out such formulations of the mixtures of resin/filler or hardener/filler themselves. Typically such operations are carried out batch-wise.

When the end processor implements the formulation, the components as a rule also are degassed, and consequently, material is available batch-wise for processing. If such material is delivered from a formulation operation, it requires being set to the proper temperature and be degassed before being processed. Such a procedure entails uneconomical work stoppages if the consumption of one batch is followed by a wait for a subsequent batch. Therefore, the typical procedure calls for such charges being sufficient for one or two work shifts a day and that replenishment, or new metering and mixing, be carried out in the time remaining, preferably at night. As a result the supply containers and mixers must be commensurately large. If, on the other hand, casting material must be available around the clock, then all batch mixers must be kept ready. These batch mixers are present upstream in front of the supply containers from which the material will then be processed. Besides the corresponding expense in construction, the supplies of material must wait for substantial durations, sometimes hours, prior to procvessing. Moreover, there are significant initial delays until processing starts. Again such batch mixers, even when designed as so-called thin-layer degassing mixers, require comparatively long mixture degassing-times because the better degassed mixture flowing back from the discharge cone into the batch is constantly being mixed with the batch as yet not optimally degassed. Illustratively, such a thin-layer degassing mixer is known from the German patent document 30 26 429 A1.

In the light of the above state of the art, it is the object of the invention to create a method, and implementing equipment as initially defined above, making continuously available components of casting resin in homogeneous and degassed form for further processing. The present invention requires less expensive construction and, as compared to the total amount of material present in the facility, being operative with small and already pre-formulated amounts of material.

SUMMARY OF THE INVENTION

The present invention overcomes the drawbacks of the prior art as the liquid components, or at least one liquid component and the filler are fed in metered manner into a continuous degassing apparatus.

Consequently, a component of casting resin and a filler for instance may be fed into the continuous degassing apparatus and already several minutes later they may arrive ready for processing. Substantial quantities of supplies are no longer involved and, therefore, the material always undergoes the same stress due to temperature, time and mixing. Moreover, the components are moved through short paths. The method of the invention allows continuously mixing and degassing both several liquid components and at least one liquid component and a filler.

The German patent document 42 22 695 A1 describes one feasible embodiment of a continuous degassing apparatus, this patent document being explicitly referred to here for its disclosure content where pertinent. The apparatus is used for continuously degassing casting resin, that is an already preformulated component. The apparatus comprises a housing fitted with an intake and an outlet for transmitting a casting-resin component and is connected to a vacuum source. Several zones are formed inside the housing which are crossed sequentially by the casting resin for its step-wise degassing, each zone being associated with means for depositing the casting resin on degassing surfaces particular to the zones and with means to transfer the casting resin into the next zone. As a result the apparatus of the German patent document 42 22 695 A1 achieves continuous degassing of a casting-resin component, without, however, simultaneous mixing into predetermined recipe portions taking place. In the invention, on the other hand, such an embodiment of the continuous degassing apparatus is used not only for degassing, but, at the same time, for degassing and mixing components of casting resin, and where called for including a filler.

In case of need, and as provided for in a first embodiment of the invention, the liquid components, and if so desired the filler, are premixed in metered ratios and then are fed into the continuous degassing apparatus. As a result mixing the liquid components and possibly the filler precedes degassing. In such a case the continuous degassing apparatus may be made more compact.

The metering of the liquid components, for instance the resin and the filler, may be carried out in the invention volumetrically and/or gravimetrically in order to obtain in this manner the particular recipe ingredients.

In an especially advantageous manner of the invention, the liquid components and optionally the filler, are continuously fed into the continuous degassing apparatus, whereby again slight quantities of supply, short paths for the components and corresponding homogeneity of the particular casting-resin component will be achieved.

As regards equipment, the problem of the invention is solved in that metering means for the liquid components, or for the at least one component and the filler, are provided upstream of the continuous degassing apparatus, again a mixer being insertable if desired between the metering means and the degassing apparatus. The mixer may be designed to be especially small, for instance as a so-called batch mixer.

In one embodiment of the invention, the mixer also may be integrated into the continuous degassing apparatus, a result of which the equipment may be made especially compact. Advantageously, identical drives, that is a single drive, shall be used, approximately in such manner that the mixing element, of the mixer and the rotational element of the continuous degassing apparatus depositing the casting-resin component on the corresponding degassing surfaces and wiping them off, shall be mounted on a common drive shaft.

The invention further allows at least two mixers being loaded with, and discharging, in mutually opposite directions, liquid components as well as a filler. Such tandem operation allows continuous material feed to the continuous degassing apparatus.

An alternative embodiment of the invention also allows designing the mixer as a continuous mixer, so that continuous feeding of preformulated material to the continuous degassing apparatus is possible.

Use can be made in the invention of volumetric metering means such as metering pumps, gear pumps, piston-cylinder systems, oval wheel meters, metering screws, etc., however, gravimetric metering means may also be used, for instance weighing scales or the like. Preferably, the metered filler will be added gravimetrically, whereas the recipe portion of the at least one liquid component shall be implemented volumetrically. Obviously the amount of filler may also be determined volumetrically using a metering worm, with the worm rotation being sensed by an incremental pickup.

If no mixer is present upstream of the continuous degassing apparatus, the filler stored at atmospheric pressure must be reliably fed into the continuous degassing apparatus in such manner that vacuum failure shall be precluded. In this respect the invention recommends to implement the metering of the filler into the continuous degassing apparatus through a pressure shutoff element 22 or lock which in its open state will feed the filler, for instance quartz dust, in metered manner into the continuous degassing apparatus.

In one conception of the invention, the continuous feed of preformulated material from the mixer into the continuous degassing apparatus can be achieved in that an intermediate container follows the mixer and simultaneously acts as an intermediate storage or buffer.

In case a mixer precedes the continuous degassing apparatus, said apparatus will be fitted with a product intake. If the liquid components and the filler, or resin and quartz dust, are directly fed into the continuous degassing apparatus, at least two product intakes will be present. However, both liquid components, that is for instance resin and hardener, also may be fed jointly into the continuous degassing apparatus and the filler will be fed into the second intake.

Further purposes, advantages, features, and applicabilities of the present invention are elucidated in the following description and in relation to the attached drawings. All described and/or graphically shown features are an object of the invention, whether per se or in arbitrary meaningful combination, and also independently of their summarization in the claims.

DETAILED DESCRIPTION OF THE PREFERRED EMBODIMENT

Figure 1:
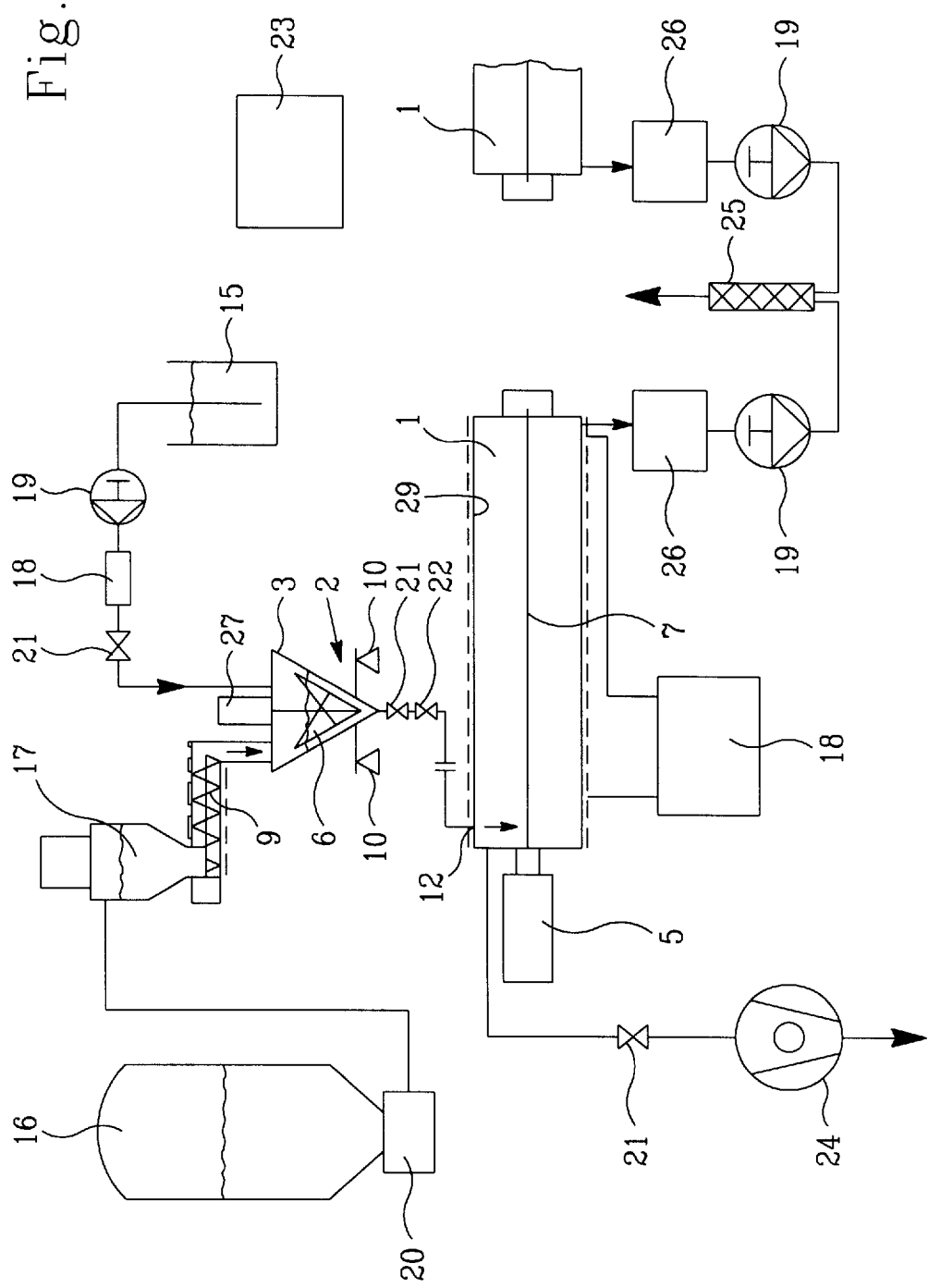
FIG. 1 depicts a schematic of a mixing and degassing apparatus according to one embodiment of the invention partly shown in section.

FIG. 1 shows casting-resin processing equipment, in particular, making possible mixing and degassing a liquid component and a filler. The equipment comprises a supply container 15 for the liquid component which is fed through a pump 19 acting as a metering means 2, a heater 18 inserted into the feed line and a subsequent valve 21 to a mixer 3, in particular a small batch mixer.

The filler in this selected embodiment, for instance quartz dust, for the one liquid component of the casting resin, is held in a silo 16 and can be moved by a conveyor system 20 into a supply vessel 17. From the supply vessel 17 the filler is also moved by a metering worm 9 into the mixer 3. The casting-resin component, for instance the resin, is mixed with the filler in the mixer 3. The mixer 3 is fitted for that purpose with a mixing element 6 driven into rotation by the mixer drive 27. The recipe portion of the resin introduction can be determined volumetrically for instance by the metering pump 19. The recipe portion also can be determined gravimetrically using the weighing scale 10 mounted on the mixer 3 as shown in FIG. 1. Preferably, the filler addition is implemented by using the weighing scale 10 to measure the weight of the mixer, weighing scale stopping the metering worm 9 by means of a control or regulation circuit, for instance by means of the control system 23, when the particular recipe portion has been reached. Thereupon the mixer 3 starts operating and mixes the liquid component and the filler within a given time interval.

The shutoff element 21, inserted in the feed line to the continuous degassing apparatus 1, is closed during the addition of the liquid component and filler and during mixing. The valve 21 opens after termination of mixing and the preformulated mixture is aspirated through the product intake 12 into the continuous degassing apparatus 1. A vacuum pump 24 preceded by the valve 21 is hooked-up to the continuous degassing apparatus 1. Continuous transit of the casting resin being fully degassed takes place in the continuous degassing apparatus 1. Illustratively, the design of the continuous degassing apparatus may be that as described in the German patent document 42 22 695 A1. FIG. 1 merely shows the drive 5 of the components of the continuous degassing apparatus, the drive 5 also comprising the rotary assembly 7 in the form of a drive shaft with means 28 to deposit the casting resin on and to wipe it off the degassing surfaces 29, as shown in more detail in the further Figures. The degassed component of casting resin together with the added filler is then fed through a metering pump 19 to a continuous mixer 25, the second component, in particular the hardener, also being fed through a continuous degassing apparatus 1, only partly shown, and a further metering pump 19 to the continuous mixer 25. An omitted casting valve may be present at the discharge of the continuous mixer 25 in order to feed the mixed casting resin to a casting mold (also omitted). Also a small collecting vessel 26 for the subsequent metering pumps 19 is provided in both component arms.

To prevent air from the mixer 3 at atmospheric pressure from breaking into the continuous degassing apparatus 1 at vacuum, the weighing scale 10 shown in FIG. 1, or for instance a filling-level probe (omitted), are provided to detect the particular filling level in the mixer 3 and to close the valve 21 when there is an appropriate minimum of this filling level.

By appropriately changing the equipment of FIG. 1, preformulated casting resin also may be continuously fed to the continuous degassing apparatus 1. For that purpose two mixers 3 operating in tandem are provided, in such manner that the casting resin of one of the mixers 3 will be discharged into the continuous degassing apparatus 1 when the other mixer 3 is being filled with casting resin and filler at the particular recipe ratio, in order to carry out its mixing.

In the further embodiments identical references denote the components corresponding to those of FIG. 1 and accordingly individual description is omitted.

Figure 2:
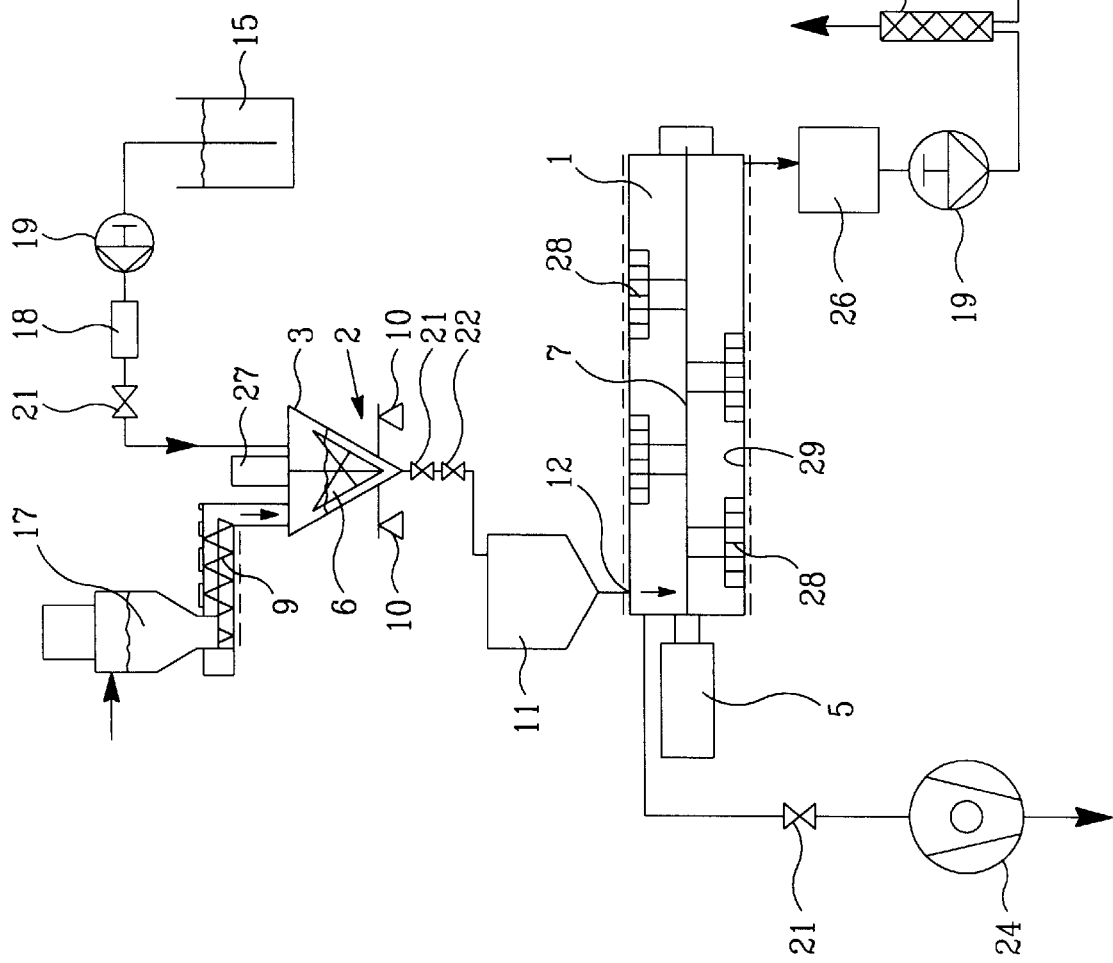
FIG. 2 depicts a schematic of a mixing and degassing apparatus according to an alternate embodiment of the invention partly shown in section.

The substantial difference between the embodiment of FIG. 2 compared to that of FIG. 1 is that an intermediate container 11 is mounted between the mixer 3 and the continuous degassing apparatus 1, said container 11 acting as a storage means for the preformulated casting resin coming from the mixer 3 and allowing continuous feed of casting resin to the continuous degassing apparatus 1.

Figure 3:
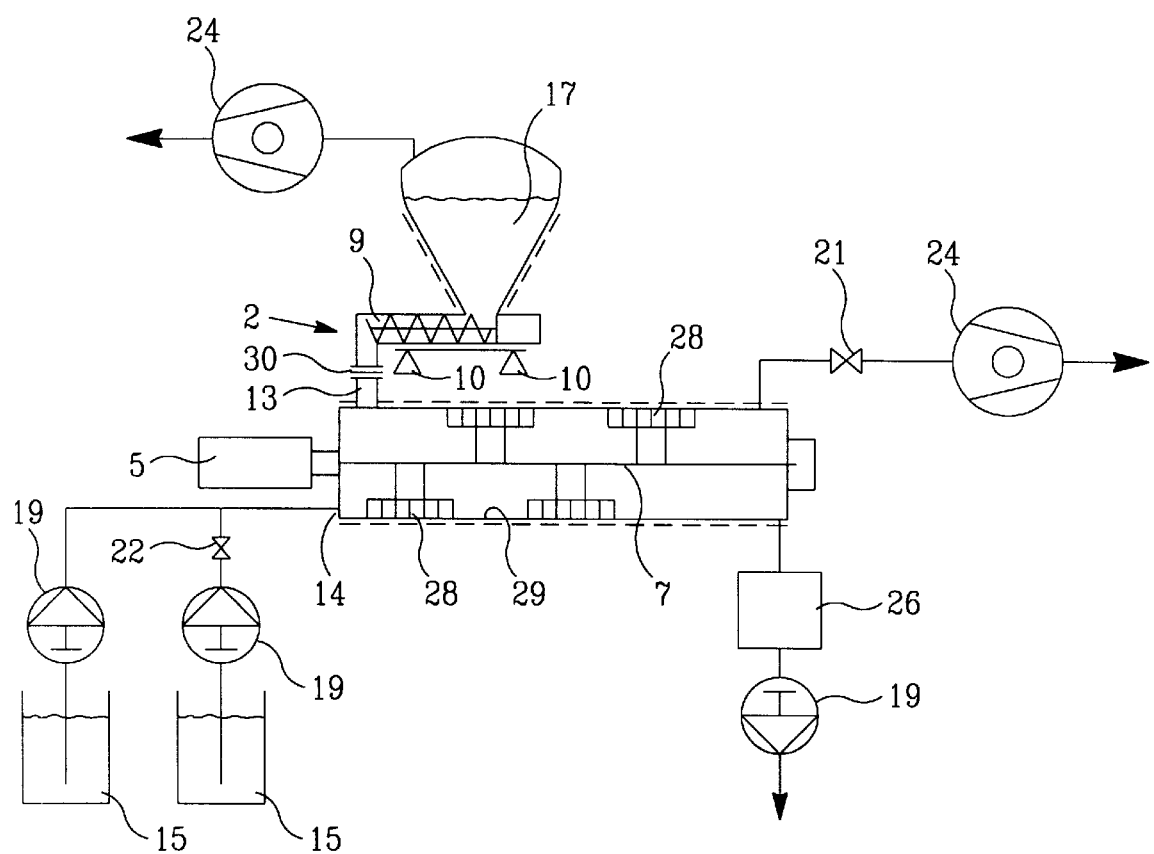
FIG. 3 depicts a schematic of a mixing and degassing apparatus according to another alternate embodiment of the invention partly shown in section.

The equipment of FIG. 3 makes possible the preparation of finished casting resin. The two liquid components, that is the hardener on one hand and on the other hand the resin, which are being received in the particular supply containers 15, and further the filler received in the supply vessel 17, are fed continuously and synchronously without any interposed mixer to the continuous degassing apparatus 1 which then assumes the function of mixing and degassing. Metering of casting resin and hardener is volumetrically carried out by the metering pumps 19, whereas the filler feed at the desired recipe portion takes place gravimetrically by means of the weighing scale 10 associated to the conveyor worm 9. For that purpose an elastic coupling element is mounted into the feed line between the metering element 2 and the product intake 13.

Two mutually inert liquid components such as resin and flexibilizer also may be supplied in the equipment of FIG. 3 by means of the supply containers 15.

In the presently discussed embodiment, the pressure in the filler storage-vessel 17 is matched to the pressure of the vacuum in the continuous degassing apparatus 1, and for that reason a vacuum pump 24 is connected to the supply vessel 17. As a result, air invasion from the supply vessel 17 into the continuous degassing apparatus 1 is prevented. On the other hand, the feed of the liquid components, namely resin and hardener, does not critically affect air invasion of the continuous degassing apparatus 1 provided that the liquid level in the supply containers 15 be above the suction apertures of the suction lines of the pumping means 19 dipping into the supply containers 15.

As shown, the continuous degassing apparatus 1 comprises at least two product intakes 13, 14 in the case of direct feed of liquid component and filler.

Figure 4:
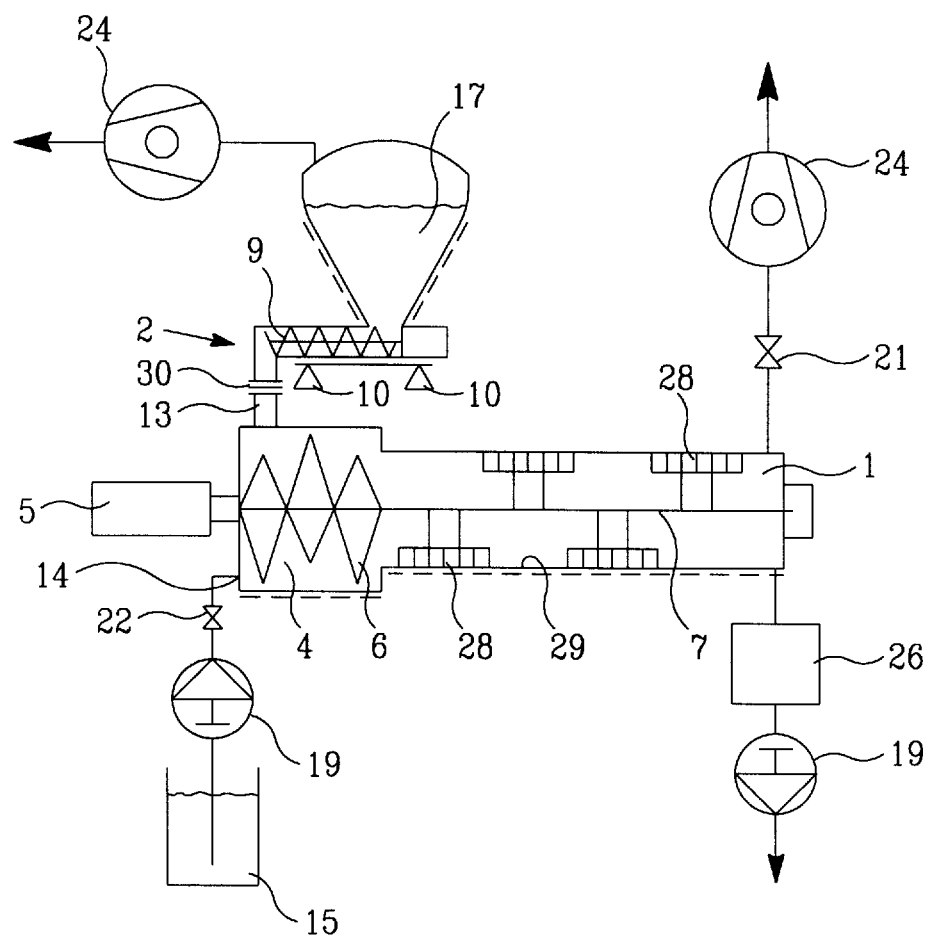
FIG. 4 depicts a schematic of a mixing and degassing apparatus according to another alternate embodiment of the invention partly shown in section.
Figure 5:
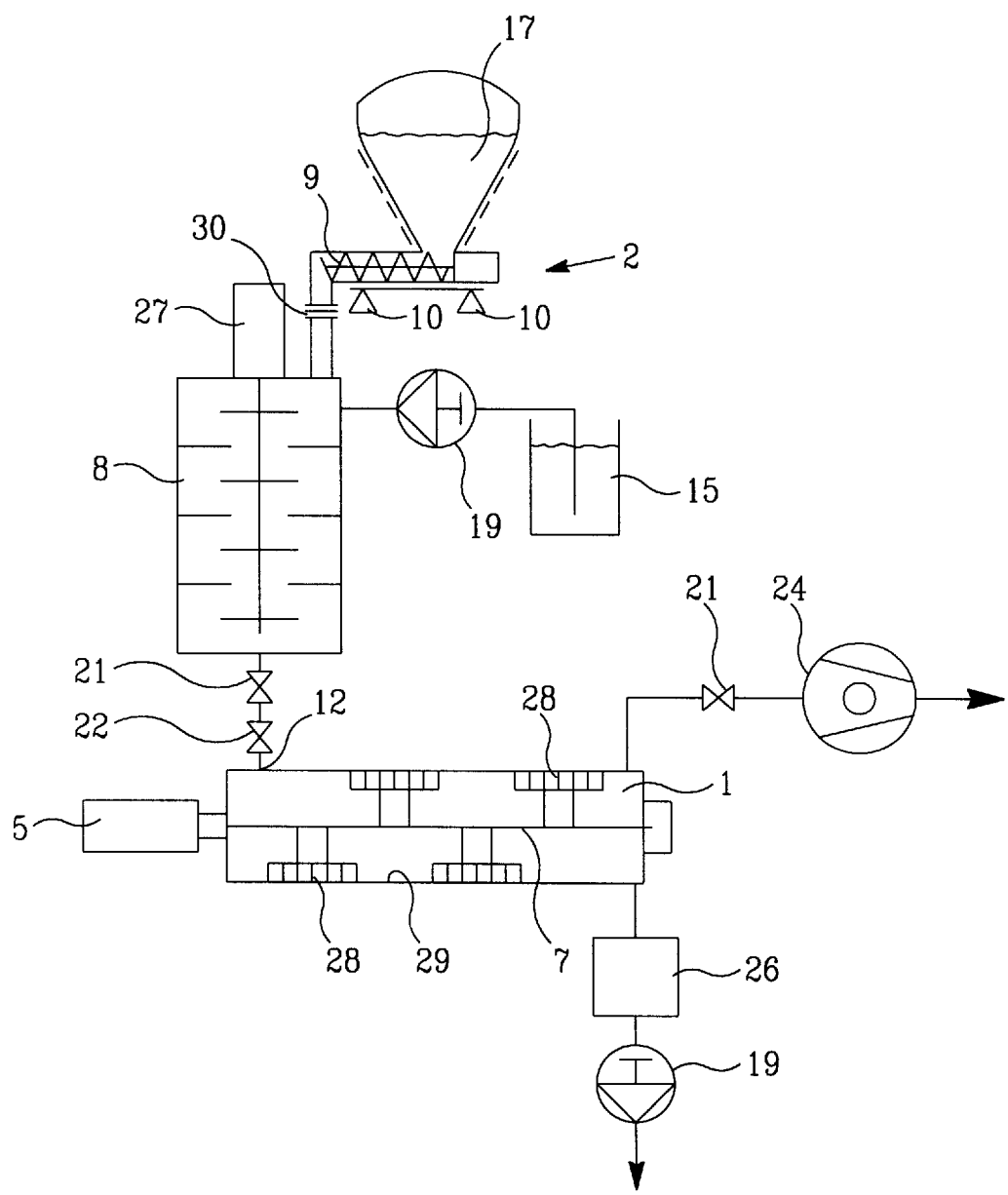
FIG. 5 depicts a schematic of a mixing and degassing apparatus according to another alternate embodiment of the invention partly shown in section.

The embodiment of FIG. 5 differs from those of FIG. 3 foremost in that a mixer 4, i.e. a mixing zone, is integrated into the continuous degassing apparatus 1. As shown by FIG. 4, a single-unit drive 5 for the mixer element 6 of the mixer 4 and for the rotary means 7 of the continuous degassing apparatus 1 having deposition and wiping means 28 is provided with a single drive shaft, thereby substantially reducing the scope of construction.

In the embodiment of FIG. 5, a continuous mixer 8 precedes the continuous degassing apparatus. This feature offers the advantage that the preformulated component is continuously fed to the continuous degassing apparatus 1 and as a result the configuration of mixers 3 operating in mutually opposite directions can be dropped.

In case that as in the embodiment of FIG. 5 the continuous mixer 8 is at atmospheric pressure, such atmospheric pressure also must be present in the supply vessel 17. If on the other hand the continuous mixer 8 is at vacuum, a corresponding relative negative pressure must be present in the supply vessel 17.

I claim:

1. A method for continuously mixing and degassing a liquid castable media, in particular components of one of a casting resin and a casting-resin component with a filler, said method comprising the step of metering and feeding the liquid castable media through a pressure shut off element to a continuous degassing apparatus (1) therein simultaneously mixing and degassing said castable media.

2. Method as claimed in claim 1, wherein the liquid castable media is premixed in metered ratios and thereafter fed to the continuous degassing apparatus (1).

3. Method as claimed in claim 2, wherein the step of metering the liquid castable media is carried out volumetrically.

4. Method as claimed in claim 2, wherein the metering of the liquid castable media is carried out by weight.

5. Method as claimed in claim 1, wherein the liquid castable media is continuously fed to the continuous degassing apparatus (1).

6. A method for continuously mixing and degassing a liquid castable media, in particular components of one of a casting resin and a casting-resin component with a filler, said method comprising the steps of:

volumetrically metering the liquid castable media in metered ratios;

premixing the liquid castable media feeding the premixed liquid castable media in metered form to a continuous degassing apparatus (1); and wherein, maintaining the filler at a vacuum.

7. Equipment for continuously mixing and degassing a liquid castable media, in particular components of one of a casting resin and a casting-resin component with a filler, said equipment comprising:

a continuous degassing apparatus (1) to continuously mix and degas said liquid castable media according to the method as claimed in claim 1;

a metering means (2) for metering the liquid castable media, wherein, said metering means is present upstream of the continuous degassing apparatus (1); and at least one supply pipe for supplying said liquid castable media, said supply pipe provided with a pressure shut off element.

8. Equipment as claimed in claim 7, further comprising a mixer (3) disposed between the metering means and the continuous degassing apparatus (1).

9. Equipment as claimed in claim 8, wherein, the mixer (3) is a continuous mixer (8).

10. Equipment as claimed in claim 9, wherein the metering means (12) comprises one of a metering pump, a gear pump, a piston-cylinder system, an oval wheel meter, a metering worm (9), and a weighing scale (10).

11. Equipment as claimed in claim 10, further comprising a pressure shutoff element for the direct metering of the filler into the continuous degassing apparatus (1).

12. Equipment as claimed in claim 11, further comprising an intermediate container (11) disposed downstream of the mixer (3) for continuously discharging the liquid castable media into the continuous degassing apparatus (1).

13. Equipment as claimed in claim 8, wherein the mixer (4) is integral with the continuous degassing apparatus (1)

and comprises a common drive (5) for a mixing element (6) of the mixer (4) connected to a rotary member (7) of the continuous degassing apparatus.

14. The Equipment according to claim 7, wherein said equipment is adapted to directly supply said filler into said continuous degassing apparatus, said equipment further comprising a vacuum pump connected to a source of said filler.

* * * * *

UNITED STATES PATENT AND TRADEMARK OFFICE
CERTIFICATE OF CORRECTION

PATENT NO. : 5,860,737
DATED : January 19, 1999
INVENTOR(S) : HAUSER, Erhard

It is certified that error appears in the above-identified patent and that said Letters Patent is hereby corrected as shown below:

On the front page of the patent, please change the assignee from Dr. Eckhard Muller, Germany to Wihelm Hedrich Vakuumanlagen GmbH & Co. KG, Germany Signed and Sealed this Nineteenth Day of October, 1999

Attest:

Q. TODD DICKINSON

*Attesting Officer*

*Acting Commissioner of Patents and Trademarks*